United States Patent [19]

Trejbal

[11] 3,823,958

[45] July 16, 1974

[54] HOUSE TRAILER STABILIZER AND JACK SYSTEM

[76] Inventor: Earl A. Trejbal, Rt. 1, Sagle, Idaho 83860

[22] Filed: May 10, 1973

[21] Appl. No.: 358,938

[52] U.S. Cl. .......................................... 280/150.5
[51] Int. Cl. .............................................. B60s 9/00
[58] Field of Search ......... 280/150.5; 248/421, 436, 248/188.2

[56] References Cited
UNITED STATES PATENTS

| | | | |
|---|---|---|---|
| 2,829,928 | 4/1958 | Callaway | 248/421 X |
| 3,537,724 | 11/1970 | Matthews | 280/150.5 |

*Primary Examiner*—Stanley H. Tollberg
*Attorney, Agent, or Firm*—Harvey B. Jacobson; Clarence A. O'Brien

[57] ABSTRACT

A stabilizer assembly is provided for use in pairs to be used in supporting and stabilizing the opposite ends of a house trailer or the like. Each assembly includes a pair of horizontally spaced first and second mounting brackets for securement to corresponding opposite side portions of a house trailer and a pair of downwardly divergent front and rear legs are provided on each mounting bracket and pivotally secured at their upper ends to the corresponding bracket for angular displacement about transverse axes extending between the mounting brackets. An elongated tension member extends between the lower ends of each pair of legs and is pivotally secured thereto with one end of the tension member and the corresponding bracket legs including structure operative to releasably establish the pivot connection therebetween at a selected point of a plurality of predetermined points spaced along the tension member. Further, diagonal bracing members extend and are secured between the opposite side legs of the stabilizer assembly.

8 Claims, 5 Drawing Figures

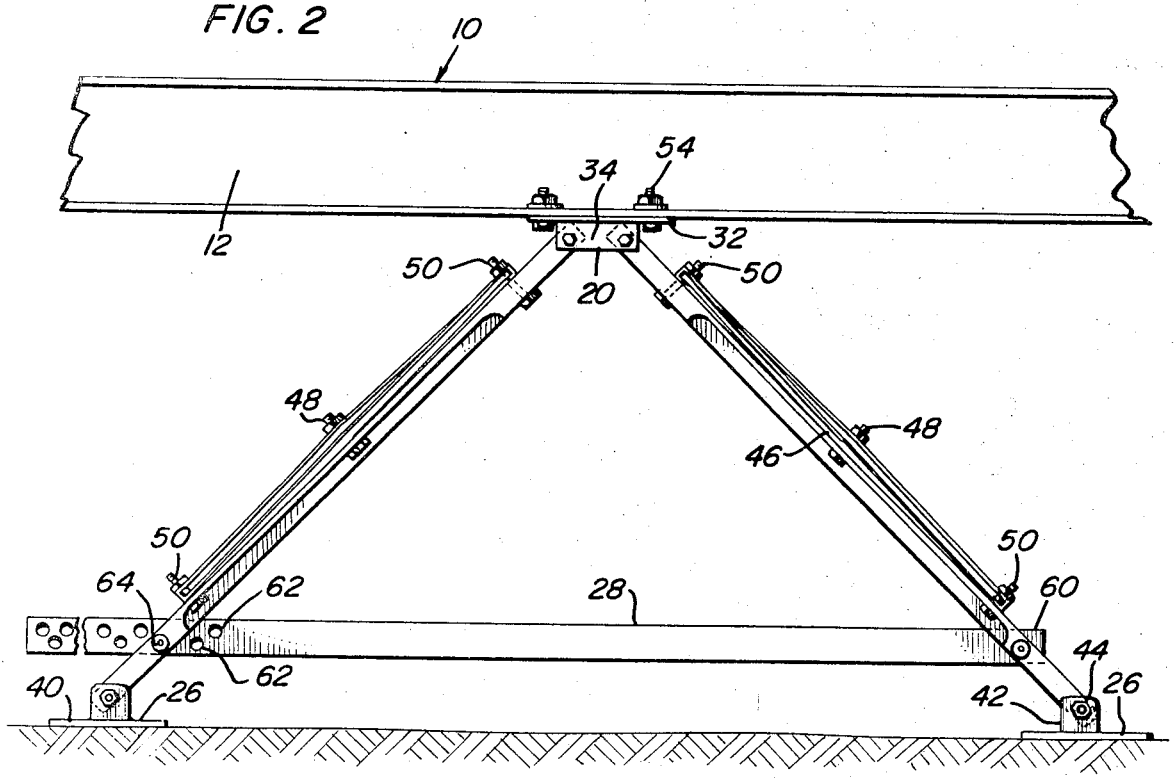
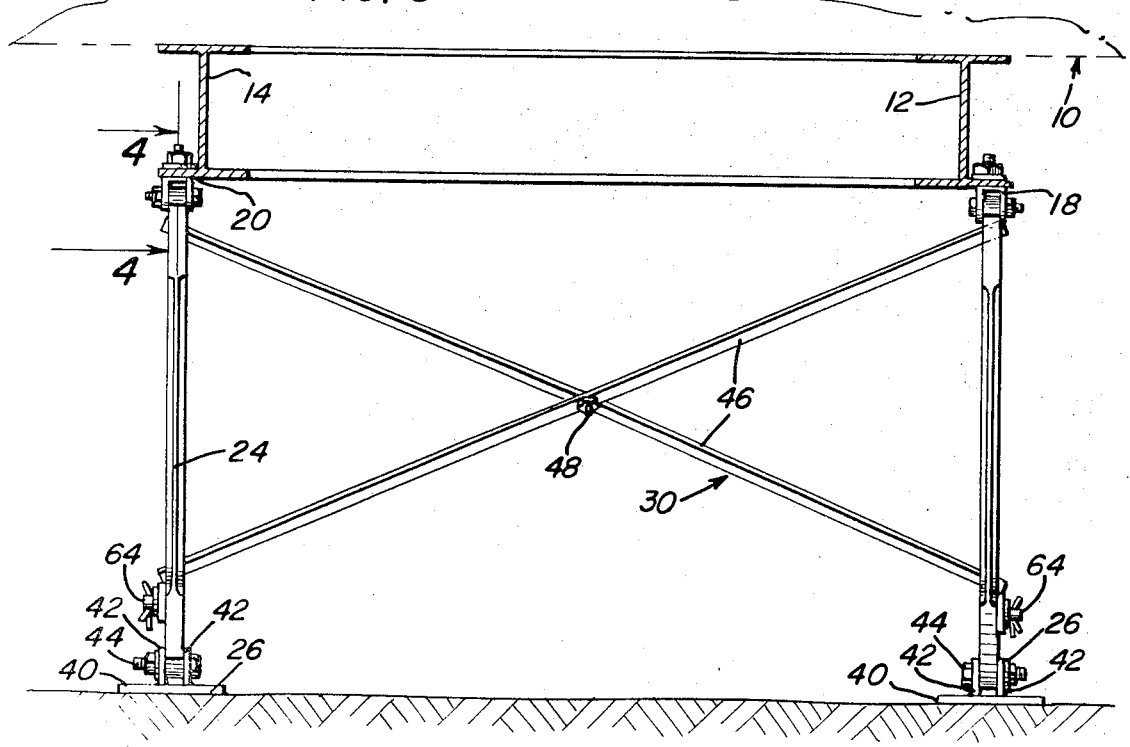

HOUSE TRAILER STABILIZER AND JACK SYSTEM

The stabilizer and support assembly of the instant invention has been designed primarily for use in stationarily supporting and stabilizing house trailer frames and the like. Each stabilizer assembly is itself well braced against relative horizontal shifting of the upper and lower end portions thereof and each stabilizer assembly upper portion includes structure for securement to the opposite side longitudinal rails of a house trailer frame. Further, the lower end portion of each stabilizer assembly includes a plurality of widely spaced apart horizontally enlarged load supporting feet for engagement with the ground or other suitable surface from which a house trailer is to be supported.

The stabilizer assembly may be used for supporting and stabilizing the opposite ends of mobile homes or trailers provided with wheeled running gear as well as those similar structures from which wheeled running gear has been removed. However, the stabilizer assembly further includes structure by which it may be retained in fully upwardly retracted position without disassembly from the associated trailer frame thereby enabling that trailer frame to be readily trailed from one location to another and supported and stabilized intermediate periods of transit.

The main object of this invention is to provide a support and stabilizing assembly for use at opposite ends of a house trailer or the like.

Another object of this invention is to provide a support and stabilizer assembly which may be readily upwardly retracted toward the associated house trailer frame and supported in retracted position during transit of the house trailer on its wheeled undercarriage.

Another object of this invention is to provide a support and stabilizer assembly which may be readily adapted for use in conjunction with various types of house trailers and mobile homes.

A final object of this invention to be specifically enumerated herein is to provide a house trailer and mobile home stabilizer and support assembly which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 2 is an enlarged side elevational view of the stabilizer and support assembly in operative association with a house trailer or mobile home longitudinal beam;

FIG. 3 is a transverse vertical sectional view illustrating the manner in which the support and stabilizer assembly is operatively associated with both opposite side longitudinal beams of a mobile home;

Figure 1:
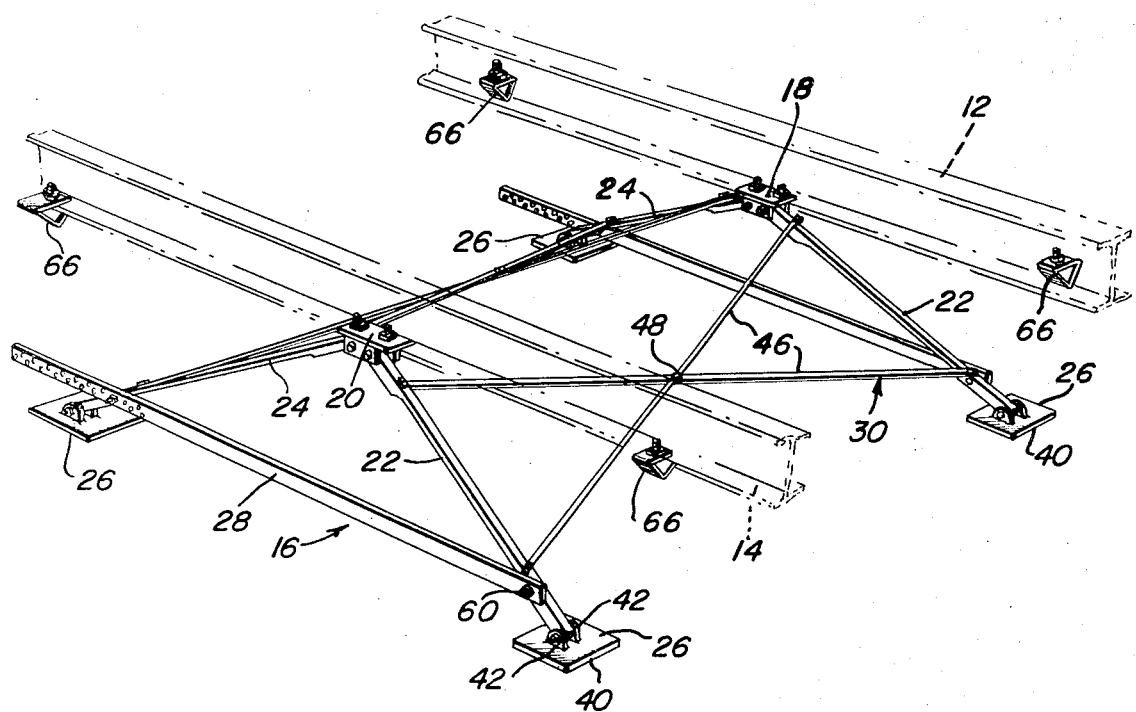
FIG. 1 is a perspective view of the support and stabilizer assembly of the instant invention illustrated in operative position relative to a pair of house trailer opposite side longitudinal beams.
Figure 4:
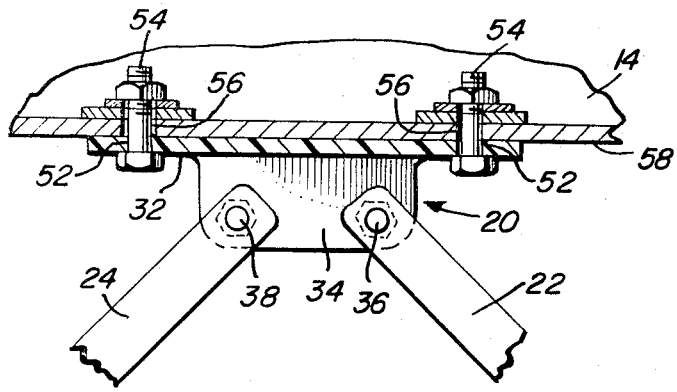
Figure 5:
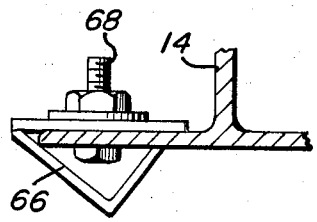

FIG. 4 is an enlarged fragmentary longitudinal vertical sectional view taken substantially upon the plane indicated by the section line 4—4 of FIG. 3; and FIG. 5 is an enlarged fragmentary transverse vertical sectional view illustrating the manner in which one of the support clips for retaining the free end portions of the legs of the stabilizer and support assembly in the retractive inoperative positions is supported from the associated longitudinal beam.

Referring now more specifically to the drawings, the numeral 10 generally designates a mobile home or house trailer including a pair of opposite side longitudinal frame beams 12 and 14.

The support and stabilizer assembly of the instant invention is referred to in general by the reference numeral 16 and includes a pair of horizontally spaced apart mounting brackets 18 and 20. Each of the brackets 18 and 20 includes a pair of depending downwardly divergent legs 22 and 24 having horizontally enlarged foot assemblies 26 pivotally supported from their lower ends and an elongated tension member 28 is provided for each pair of legs 22 and 24 and has one end thereof pivotally secured to the leg 22 and the other end thereof pivotally secured to the corresponding leg 24. Further, a crossed bracing structure referred to in general by the reference numeral 30 extends and is secured between each pair of corresponding legs 22 and 24.

Each of the mounting brackets 18 and 20 includes an upper horizontal longitudinally extending plate portion 32. Each plate portion 32 includes a pair of opposite side depending parallel longitudinal flanges 34 and the upper ends of the corresponding legs 22 and 24 are pivotally secured between the front and rear ends, respectively, of the flanges 34 by means of pivot fasteners 36 and 38.

Each of the foot members 26 includes a generally square base plate 40 including a pair of horizontally spaced apart upstanding flanges 42 between which the lower end portion of the corresponding leg is secured by means of a fastener 44.

Each cross bracing structure 30 includes a pair of crossed bracing members 46 secured together at their crossed mid-portions by means of a fastener 48. The bracing members 46 extend between and are secured to opposite ends of the corresponding legs by means of fasteners 50.

Each of the plates 32 is provided with a pair of opposite end upstanding bores 52 and a pair of fasteners 54 are secured through each pair of corresponding bores 52 formed in the plates 32 and similar bores 56 formed in the lower horizontal flange 58 of the associated longitudinal beam.

The forward ends of the tension members 28 are pivotally secured to the lower end portions of the front legs 22 by means of pivot fasteners 60 and the rear ends of the tension members 28 are provided with longitudinally spaced staggered apertures 62. Also, the lower ends of the rear legs 24 include corresponding transverse apertures through which pivot fasteners 64 are secured, the fasteners 64 also being secured through selected bores or apertures 62 whereby each tension member 28 is securely anchored, at its opposite end portions, to the lower ends of the corresponding legs 22 and 24.

Other than the various fasteners mentioned hereinabove, the stabilizing and support assembly 16 is preferably constructed of strong plastic or metal which is noncorrosive. In addition, the fasteners 64 are readily removable and it may therefore be seen that the lower ends of each pair of legs 22 and 24 may be swung upwardly toward the corresponding longitudinal beam of the trailer or mobile home 10. Each beam 12 and 14 has a pair of spring clips 66 secured thereto by means of fasteners 68 at points spaced forward of and to the rear of each plate 32. When the lower ends of the legs 22 and 24 are swung upwardly after the fasteners 64 have been removed, the remote ends of each pair of legs 22 and 24 are engageable with the spring clips 66 in order that the latter may retain the legs 22 and 24 in their upwardly displaced retracted positions.

The tension members 28 are of sufficient length to extend between the fasteners 60 and the fasteners 64 when the legs 22 and 24 are swung upwardly to their retracted positions engaged by the clips 66. Thus, after the legs 22 and 24 have been clipped and thus releasably supported in their retracted positions, the fasteners 64 secured through the lower ends of the legs 24 are passed through selected bores 62 at the rear ends of the tension members 28. Thus, downward swinging movement of the legs 22 and 24 is not only prevented by their engagement with the clips 66, but also by the securement of the tension members 28 therebetween.

The spring clip members 66 are preferably constructed of metal, although they may be also constructed of a suitable plastic. Further, the various fasteners, other than the fasteners 36, 38, 42, 60 and 64 may also be constructed of plastic inasmuch as these fasteners are not subject to heavy shearing forces.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is as follows:

1. A stabilizer for use beneath a house trailer or the like, said stabilizer comprising horizontally spaced first and second mounting brackets for securement to corresponding opposite side portions of a house trailer, a pair of downwardly divergent front and rear legs for each of said mounting brackets pivotally supported at their upper ends to the corresponding brackets for angular displacement about transverse axes extending between said mounting brackets, an elongated tension member extending between the lower ends of each pair of legs and pivotally secured thereto, one end of each tension member and the corresponding leg including means operative to releasably establish the pivot connection therebetween at a selected point of a plurality of predetermined points spaced along said one end of said tension member, and a diagonal brace means extending and connected between said pairs of legs.

2. The combination of claim 1 wherein the lower ends of said legs include enlarged foot members pivotally supported therefrom for oscillation about axes generally paralleling the first mentioned axes.

3. The combination of claim 1 wherein said front and rear legs of each pair of legs are pvivotally secured to the corresponding mounting brackets for oscillation about horizontally spaced apart front and rear axes, respectively.

4. The combination of claim 1 wherein said brace means includes a pair of crossed brace members secured between the upper and lower ends of said front legs and a second pair of crossed brace members extending and secured between the upper and lower ends of said rear legs.

5. The combination of claim 4 including means securing the crossed portions of each pair of crossed brace members together.

6. In combination with a mobile house trailer or the like including longitudinally extending opposite side marginal portions, a pair of first and second mounting brackets secured to corresponding portions of said side marginal portions, a pair of downwardly divergent front and rear legs for each of said mounting brackets pivotally supported at their upper ends to the corresponding brackets for angular displacement about transverse axes extending between said mounting brackets, an elongated tension member extending between the lower ends of each pair of legs and pivotally secured thereto, one end of each tension member and the corresponding leg including means operative to releasably establish the pivot connection therebetween at a selected point of a plurality of predetermined points spaced along said one end of said tension member, and diagonal brace means extending and connected between said pairs of legs, the lower ends of each pair of legs, when said one end of the corresponding tension member is released, being swingable upwardly to retracted positions disposed in generally horizontal positions, said tension members each being of a length to extend between the remote ends of the corresponding legs when they are horizontally disposed, said means operative to releasably establish said pivot connection also including means to secure said one ends of said tension members to the corresponding leg ends when said legs are horizontally disposed.

7. The combination of claim 6 wherein said side marginal portions each include means spaced in both directions therealong from the corresponding mounting bracket adapted to releasably engage and support the corresponding leg end when said legs are disposed in said retracted positions.

8. The combination of claim 1 wherein said brackets, legs and tension members are constructed of noncorrosive materials.

* * * * *